United States Patent [19]

Yasuhara

[11] Patent Number: 4,597,369
[45] Date of Patent: Jul. 1, 1986

[54] FUEL CUTOFF APPARATUS FOR FUEL INJECTION PUMP FOR DIESEL ENGINE

[75] Inventor: Seishi Yasuhara, Yokohama, Japan

[73] Assignee: Nissan Motor Company, Limited, Japan

[21] Appl. No.: 380,891

[22] Filed: May 21, 1982

[30] Foreign Application Priority Data

May 25, 1981 [JP] Japan .................... 56-77982

[51] Int. Cl.[4] .......................................... F02M 39/00
[52] U.S. Cl. ........................ 123/458; 123/198 DB; 123/501
[58] Field of Search ............... 123/458, 497, 498, 499, 123/501, 506, 198 DB; 417/440, 441, 456, 505; 251/121, 129, 137

[56] References Cited

U.S. PATENT DOCUMENTS

| | | | |
|---|---|---|---|
| 2,970,246 | 1/1961 | Gunkel | 123/458 |
| 3,814,376 | 6/1974 | Reinicke | 251/137 |
| 4,059,369 | 11/1977 | Eheim | 123/458 |
| 4,065,096 | 12/1977 | Frantz | 251/137 |
| 4,073,277 | 2/1978 | Eheim | 123/501 |
| 4,173,031 | 10/1979 | Leichle | 123/458 |
| 4,192,279 | 3/1980 | Maisch | 123/198 DB |
| 4,402,290 | 9/1983 | Hofer | 123/198 DB |
| 4,426,969 | 1/1984 | Eheim | 123/198 DB |
| 4,452,196 | 6/1984 | Indra | 123/198 DB |

FOREIGN PATENT DOCUMENTS

| | | | |
|---|---|---|---|
| 583977 | 1/1947 | United Kingdom | 123/458 |
| 1249262 | 10/1971 | United Kingdom | 123/458 |
| 1315493 | 5/1973 | United Kingdom | 123/458 |
| 1387138 | 3/1975 | United Kingdom | 123/458 |
| 1530725 | 11/1978 | United Kingdom | 123/458 |
| 2023348A | 12/1979 | United Kingdom | 123/458 |

Primary Examiner—Carl Stuart Miller
Attorney, Agent, or Firm—Lowe, Price, Leblanc, Becker & Shur

[57] ABSTRACT

A fuel cut-off valve in the fuel injection pump of an internal combustion engine is provided with a device for facilitating the opening of the valve against pressure forces normally biasing the valve closed. A pair of solenoids may be provided, with both being used to open the valve and only one to hold the valve open. Alternately, a single solenoid may be supplied with a large quantity of power to open the valve, and considerably small power to hold the valve open. In a second alternative, an auxiliary passageway is formed in the valve, and a pressure relief valve normally blocking the auxiliary passageway can be opened to alleviate the pressure on the first valve.

19 Claims, 7 Drawing Figures

FUEL CUTOFF APPARATUS FOR FUEL INJECTION PUMP FOR DIESEL ENGINE

BACKGROUND OF THE INVENTION

The present invention relates to a fuel injection pump for a diesel engine and more particularly to a fuel cutoff apparatus for such a fuel injection pump which stops delivery of fuel when the pump stops.

Conventionally, a fuel distribution-type fuel injection pump used for a diesel engine propels fuel from an inlet to a pump chamber by the force of a vane pump. The rotational and reciprocal operation of a plunger cooperating with the vane pump draws fuel in the pump chamber through an intake passageway into a high-pressure chamber. Fuel is forced out of the high-pressure chamber by the plunger via a passageway provided in the plunger, a plurality of distribution holes in a housing around the plunger, corresponding discharge passageways and delivery valves to corresponding fuel injector nozzles.

The pump is provided with an electromagnetic fuel cutoff valve midway along the fuel intake passageway, which interrupts the flow of fuel to the respective injector nozzles during engine deceleration. The fuel cut-off valve is designed to re-open during engine deceleration at an engine speed greater than that at which the throttle valve opens in order to prevent abrupt changes in acceleration.

When the fuel cutoff valve is closed, it is subjected to the combination of the internal pressure of up to 10 kg/cm$^2$ within the intake passageway and the vacuum pressure ($-1$ kg/cm$^2$) from the high-pressure chamber. Thus, when the fuel cutoff valve is to be opened again, a very large force is required.

The present invention intends to facilitate actuation of the valve member in its stroke away from the fuel passageway.

SUMMARY OF THE INVENTION

Means is provided which facilitates the movement of the valve member of a fuel cutoff valve away from a fuel passageway leading to an engine when the fuel injection pump for the engine is to be started. After the valve member has been moved away from the passageway, the valve member is held away from the passageway.

In a first embodiment, when the valve member is to be moved away from the fuel passageway, a pair of coils are energized together and cooperate to produce a relatively large electromagnetic force sufficient to move the valve member away from the fuel passageway. After the valve member has been moved away, only one of the two coils is energized to hold the valve member away from the fuel passageway.

In a second embodiment, when the valve member is to be moved away from the passageway, a single electromagnetic coil is energized with a relatively large current sufficient to move the valve member away from the passageway. After the valve member has been moved away, the coil is energized with a relatively small current sufficient to hold the valve member away from the passageway.

In a third embodiment, when the valve member is to be moved away from the passageway, a single electromagnetic coil is energized to move a pressure relief member away from an auxiliary passageway provided in the abovementioned valve member, thereby allowing fuel to flow through the auxiliary passageway and reduce the net force on the valve member. Then the valve member is moved by the electromagnetic force produced by the coil away from the first-mentioned passageway.

Thus, a command to open the fuel cutoff valve can be reliably executed in higher ranges of engine speed. After the valve is open, the consumption of electric power is smaller than during valve opening. This saves electric power and extends the life of the fuel cutoff valve.

The features and advantages of the present invention will be apparent from the following description of preferred embodiments of the present invention, taken in conjunction with the accompanying drawings.

BRIEF DESCRIPTION OF THE DRAWINGS

Like reference numerals denote similar elements throughout the drawings in which.

DETAILED DESCRIPTION OF THE PREFERRED EMBODIMENTS

Figure 1:
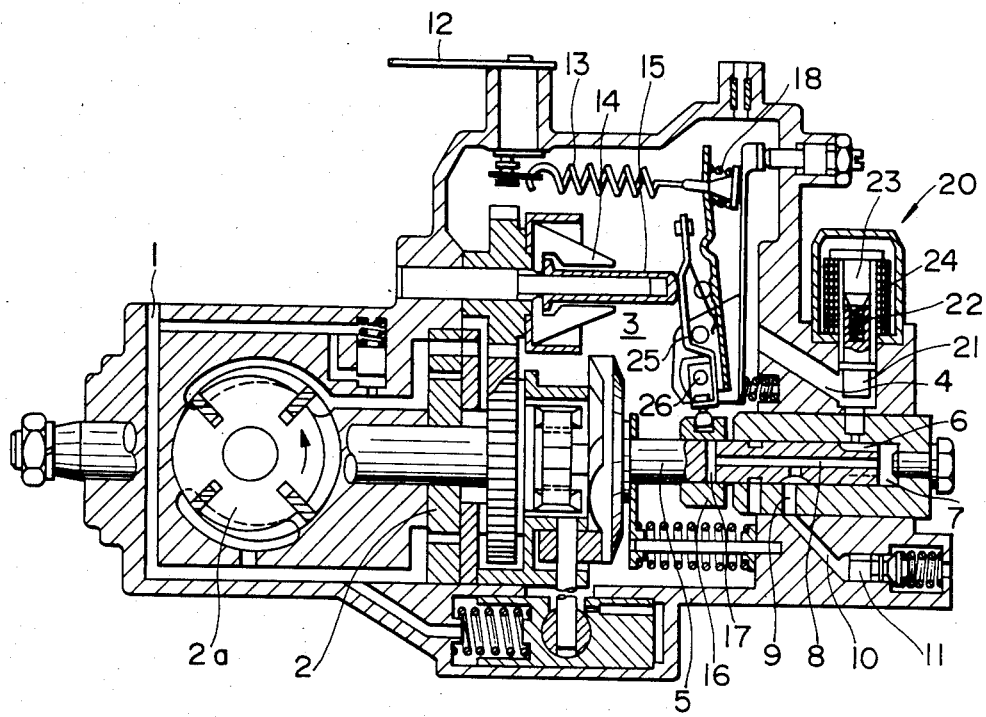
FIG. 1 is a diagrammatic cross-sectional view of a prior art distribution-type fuel injection pump.

In order to facilitate understanding of the present invention, first, a brief description of a prior art distribution-type fuel injection pump system will be given with reference to FIG. 1. In FIG. 1, fuel is conducted from an inlet 1 to a pump chamber 3 by the rotation of a vane pump 2 the cross-sectional view of which is shown at 2a rotated through 90° for clarity. The fuel within the pump chamber 3 is drawn via an intake passageway 4 and a registering one of a plurality of grooves 6 to a high-pressure pump chamber 7 by the rotational and reciprocal movement of a plunger 5 developed in response to rotation of the vane pump 2. Fuel is forced out by the action of the plunger 5 through a plunger passageway 8 and a registering one of a plurality of distributing grooves 9 to the corresponding discharge port 10 and hence via the corresponding delivery valve 11 to the corresponding fuel injection nozzle, not shown, for injection into the corresponding engine cylinder, also not shown.

The force of a main spring 13 determined by a control lever 12 which is connected to the accelerator pedal, not shown, and the force of a governor sleeve 15 of a governor 14 determined by engine speed control the position of a control sleeve 16 via a linkage 25 and a pivot 26. Control sleeve 16 adjusts the fuel quantity to be injected and adjusts the timing of the opening of a pressure-relief orifice 17, thereby controlling the fuel injection quantity ranging from zero to a maximum.

Figure 2:
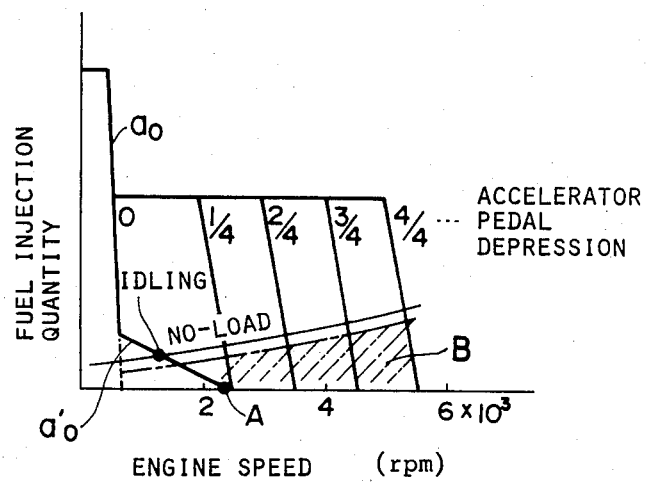
FIG. 2 shows the injection characteristic of the pump.

During idling when main spring 13 is fully relaxed, an idle spring 18 adjusts the position of sleeve 16 in order to moderate the start-up fuel injection curve $a_0$ to that labeled $a'_0$, in FIG. 2, for stabilizing purposes. Otherwise, a downward extension, shown by the phantom line, of the curve $a_0$ would intersect a no-load curve at greater angles than the angles at which the curve $a'_0$ intersect the no-load curve so that a change in fuel injection quantity to a change in engine speed is large, thereby resulting in engine speed hunting.

When engine speed is rapidly decreased from high speed with the accelerator pedal released, fuel injection is restarted at a speed below a speed A in FIG. 2. If the speed A is excessively low, the restart of fuel injection may be so delayed that the engine stalls. Thus, the point A is selected to be between 1,500 and 2,500 rpm.

The pump is provided with an electromagnetic fuel cutoff valve 20 along the fuel intake passageway 4. Valve 20 includes a valve member 21, a spring 22 biasing the valve member 21 downward, an iron core 23 and an electromagnetic coil 24. When the engine is at rest, the valve member 21 blocks the fuel intake passageway 4, whereas during operation, the coil 24 is generally energized and electromagnetically lifts the valve member 21 to open the fuel intake passageway 4.

When the accelerator pedal, not shown, is in the position of zero depression, the fuel cutoff valve 20 is closed above engine speed A, as shown in FIG. 2.

Figure 3:
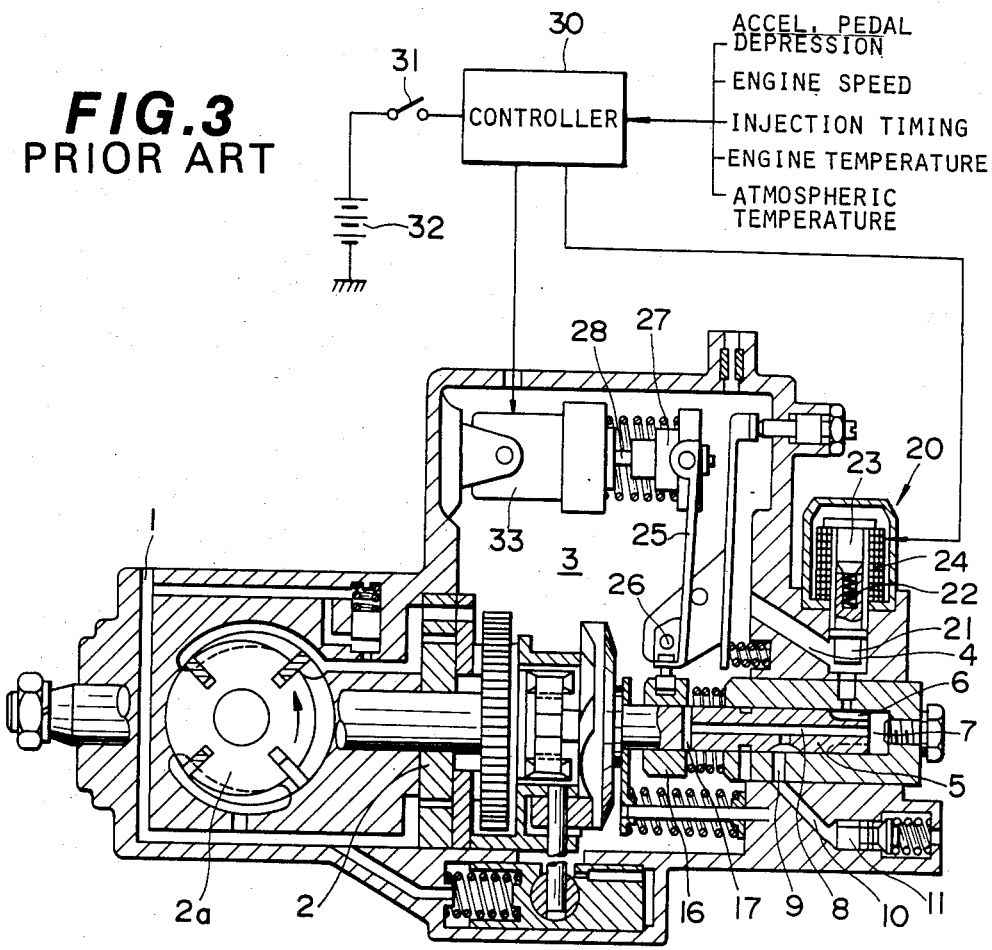
FIG. 3 is a view similar to FIG. 1 of another prior art electronically controlled distribution-type fuel injection pump.

In FIG. 3, another prior art electronically controlled distribution type fuel injection pump is shown which includes the fuel cutoff valve 20. The pump includes a control unit 30, which is connected via an engine key switch 31 to a battery 32. Control unit 30 receives a plurality of parameter signals indicative of accelerator pedal depression angle, engine speed, injection timing, engine temperature and atmospheric temperature and calculates a control signal which operates a servomotor 33 which in turn controls the position of the control sleeve 16 through a slider 27 movable along a threaded shaft 28 of the servomotor 33 when the servomotor is actuated, and through the linkage 25 the upper end of which is pivoted to the slider 27. The control unit 30 also controls the operation of the fuel cutoff valve 20 to determine fuel cutoff area B, such as shown in FIG. 2. From the standpoint of engine response, it is necessary to hold the control sleeve 16 at a non-load position and to hold fuel cutoff valve 20 closed in order to block the fuel intake passageway 4 when the engine is braking, and to open the fuel cut-off valve 20 to permit full fuel injection again upon the onset of acceleration.

Figure 4:
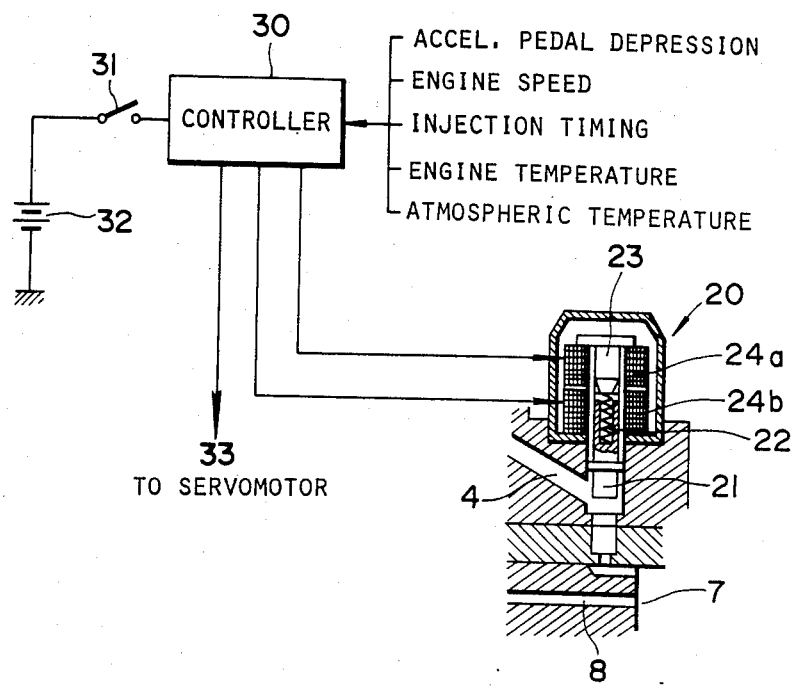
FIG. 4 is a cross-sectional view of a fuel cutoff apparatus according to the present invention, diagrammatically associated with related elements and the control unit of a fuel injection pump.

Referring to FIG. 4, there is shown a fuel cutoff valve 20 according to the present invention. The valve 20 of FIG. 4 is used in conjunction with the pump of FIG. 3 in place of the valve 20 of FIG. 3. The valve 20 of FIG. 4 includes a pair of electromagnetic coils 24a and 24b disposed coaxially and adapted to be energized at predetermined individual power ratings by the controller 30. The coil 24a produces electromagnetic force sufficient to hold the valve member 21 away from the fuel passage 4. The coil 24b cooperates with the coil 24a to produce sufficient electromagnetic force to move the valve member 21 away from the fuel passageway when they are both energized by the controller 30. When the pump is to be operated, the two coils 24a and 24b are simultaneously energized by the controller 30 to move the valve member 21 away from the fuel passageway 4. After the valve member 21 has been moved away from the fuel passage 4, the coil 24a alone is maintained energized to hold the valve member 21.

Figure 5:
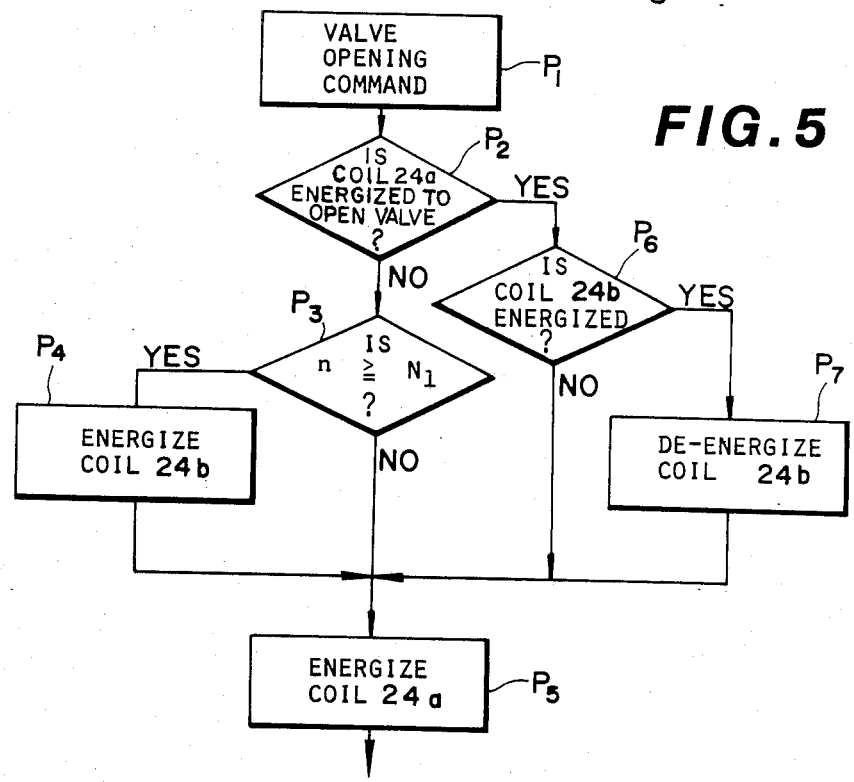
FIG. 5 is a flowchart of a control program executed by the control unit.

A flowchart for control of the supply of energizing current to the coils 24a and 24b is shown in FIG. 5. When the command to open the valve 20 is issued at a step $P_1$, it is determined whether the coil 24a is being energized to open the valve at step $P_2$. If the coil is not energized to open, it is determined at step $P_3$ whether engine speed n is above a minimum value $N_1$, in which case the valve 20 cannot be opened by the electromagnetic force produced by coil 24a alone. If $n < N_1$, coil 24a alone is energized at step $P_5$ whereas if $n \geq N_1$, coil 24b is energized at step $P_4$ and then coil 24a is energized at step $P_5$. If the coil 24a is determined at step $P_2$ to be energized to open the valve, it will be determined whether coil 24b is energized at step $P_6$. If so, the supply of electric current to coil 24b is shut off at step $P_7$, and coil 24a alone is supplied with electric current at step $P_5$, thereby holding the valve 20 open. Otherwise, coil 24a is energized at step $P_5$. As will be seen from above, when the valve 20 is held open, only coil 24a receives electric current so that the power consumed is much smaller than the power required to open the valve, thereby preventing waste of electric energy.

Figure 6:
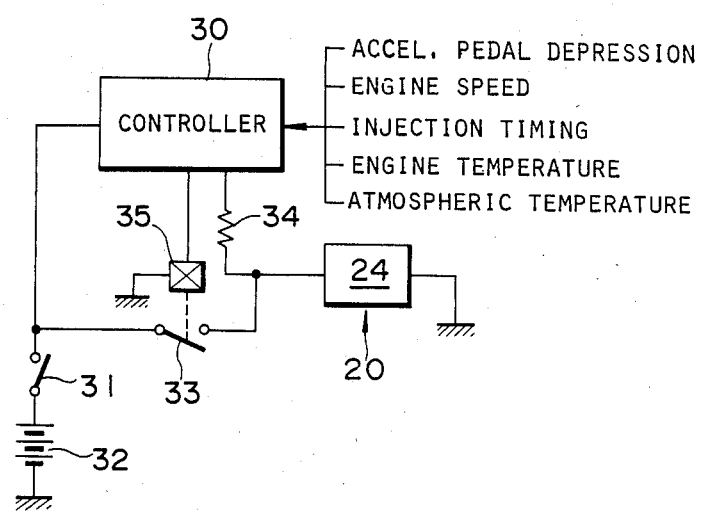
FIG. 6 is a view similar to FIG. 4 of a second embodiment of the present invention.

Referring to FIG. 6, there is shown a second embodiment of the present invention. In this embodiment, the fuel cutoff valve 20 has a structure similar to that of the valve 20 shown in FIG. 3 and a single, relatively large electromagnetic coil 24 is used which increases the electromagnetic force available for opening the valve. The electric current supplied to the coil 24 is larger while the valve is being opened than after the valve has been opened. In more detail, when the valve 24 is to be opened, a relay coil 35 is energized from the controller 30 thereby closing a relay switch 33. This causes a battery 32 to supply a relatively large current via the switch 33 to the coil 24 of the valve 20, thereby providing proportionately increased power for opening the valve. After the valve has been opened, the supply of electric current to the coil 24 is stopped so that the switch 33 is opened and at the same time, the coil 24 is supplied with relatively small current from the controller 30 via a resistor 34. This conserves power while holding the valve 20 open.

Figure 7:
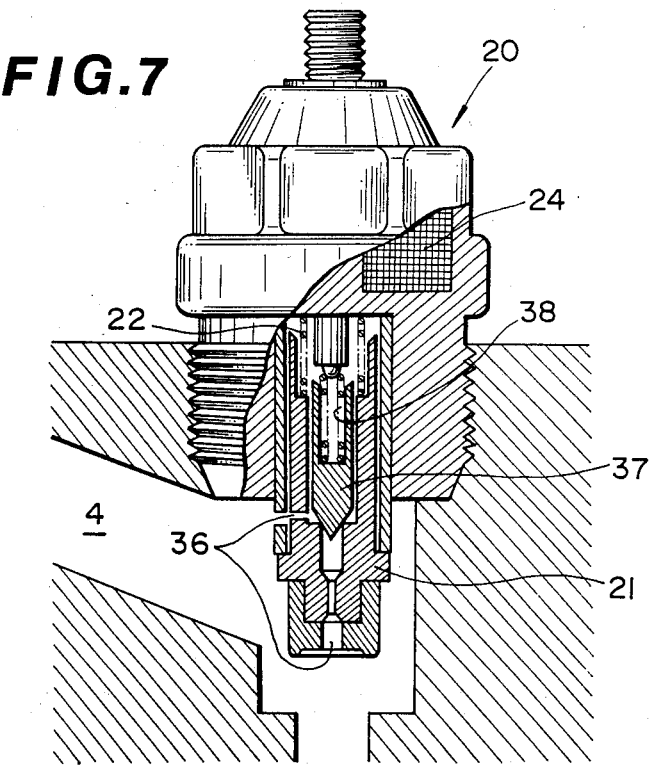
FIG. 7 is a view similar to FIG. 4 of a third embodiment of the present invention.

Referring to FIG. 7, there is shown a third embodiment of the present invention. In the particular embodiment, the load exerted on the electromagnetic coil 24 when the valve 20 is to be opened is decreased so that the opening of the valve can be more easily carried out. In more detail, the valve member 21 is provided with an L-shaped auxiliary passageway 36 therein communicating between the upstream and downstream sides of the valve member 21 and a pressure relief member 37 disposed to be movable coaxially within the valve member 21. The pressure relief member 37 is normally biased downward by a spring 38 so as to block the passageway 36. When the coil 24 is energized, the pressure relief member 37 is first drawn upward by the electromagnetic force produced by the energization of the coil 24. Since the area of the valve seat of member 37 is relatively small, the power required to open the pressure relief member 37 is relatively small. This allows the passageway 36 to be opened, thereby reducing the difference between the pressure exerted on the valve member 21 on the upstream side thereof and the vacuum pressure exerted on the valve member 21 on the downstream side thereof. This allows a relatively small electromagnetic force to actuate the valve member 21, thereby opening the passageway 4. The structure of this valve is somewhat complicated compared to that of FIG. 4, but two-step operation of the valve by the controller 30 is not required so that controller 30 is somewhat simplified overall.

While the present invention has been described in terms of preferred embodiments thereof, it should be noted that the present invention should not be restricted to these embodiments. Various modifications and changes could be made by those skilled in the art without departing the spirit and scope of the present invention as set forth in the attached claims.

What is claimed is:

1. A fuel cutoff apparatus for a fuel injection pump in an internal combustion engine, comprising:
    (a) a valve member movable to selectively open or block a port connecting a source of fuel to a fuel line;
    (b) an electromagnetic coil means selectively energizable at a plurality of distinct energy levels to move said valve member to open or block the port; and
    (c) a controller means for energizing said electromagnetic coil means to pen said port in response to a valve opening command by determining whether the energy level of said coil means is at an energy level causing said valve member to open or to block said port, said controller means being further operable for determining a characteristic of engine speed of said engine when said energy level of said coil means is determined to be at a level causing said valve member to block said port member, for providing a variable level of electrical current to said coil means as a function of said engine speed characteristic for opening said port, and for selecting the electrical current in accordance with said engine speed characteristic whereby said controller causes said valve member to open said port with efficient current utilization.

2. A method of facilitating efficient operation of a fuel cutoff apparatus which selectively blocks and opens a port connecting a fuel source and a fuel pump of an engine with a ferromagnetic valve member actuable by an electromagnetic coil winding means, comprising the steps of:
    (a) determining whether said valve member is caused by said electromagnetic coil winding means to block said port;
    (b) when it is determined that said valve member is caused to block said port, determining whether engine speed is above a predetermined value;
    (c) energizing said coil winding means to a first degree so as to impart large opening force to said valve member to cause said valve member to open said port when engine speed is determined to be above the predetermined value and when it is determined that said valve member is caused to block said port; and
    (d) energizing said coil winding means to a second degree less than said first degree so as to impart to said valve an opening force smaller than said large force to open said port when said valve member is determined to be caused to block said port and said engine speed is determined to be below the predetermined value.

3. A fuel cutoff apparatus for fuel injection pump in an internal combustion engine, comprising:
    (a) a valve member movable to selectively open or block a port connecting a source of fuel to a fuel line;
    (b) an electromagnetic coil means selectively energizable at a plurality of distinct energy levels to move said valve member to open or block the port; and
    (c) a controller means for determining whether the energy level of said coil means is at an energy level causing said valve member to open or block said port, for determining whether engine speed is above a predetermined value when said energy level of said coil means is determined to be at a level causing said valve member to block said port, and for energizing said coil means to a first degree so as to impart a large opening force to said valve member to cause said valve member to open said port when engine speed is determined to be above the predetermined value and when said coil means is determined to be energized to a level causing said valve member to block said port, and for energizing said coil means to a second degree less than the first degree so as to impart a relatively small opening force to said valve member to cause said valve member to open said port when engine speed is determined to be below the predetermined value and when said coil means is determined to be energized at a level causing said valve member to block said port.

4. A method of facilitating efficient operation of a fuel cutoff apparatus for a fuel injection pump which selectively blocks and opens a port connecting a fuel source and a fuel pump of an engine with a ferromagnetic valve member actuable by an electromagnetic coil winding means, said coil winding means selectively energizable at a plurality of distinct energy levels to move said valve member, said valve member having an auxiliary fuel passageway extending therethrough so as to communicate between the source of fuel and the fuel line and further including a pressure relief member disposable in said auxiliary fuel passageway and means for biasing said pressure relief member so as to normally block said auxiliary fuel passageway, comprising the step of:
    (a) determining whether said coil winding means is energized to an energy level causing said valve member to block said port;
    (b) when it is determined that said valve member is caused to block said port, determining whether engine speed is above a predetermined value; and
    (c) energizing said coil winding means to a first degree so as to impart an opening force to said valve member to move said pressure relief member to unblock said auxiliary fuel passageway when engine speed is determined to be above the predetermined value and thereafter to move said valve member to open said port.

5. A method of facilitating efficient operation of a fuel cutoff apparatus which selectively blocks and opens a port connecting a fuel source and a fuel pump of an engine with a ferromagnetic valve member actuable by an electromagnetic coil winding means s, said coil winding means selectively energizable at a plurality of distinct energy levels to move said valve member, comprising the steps of:
    (a) determining whether said electromagnetic coil winding means is energized to an energy level causing said valve member to block said port;

(b) when it is determined that said electromagnetic coil winding means is energized to cause said valve member to block said port, determining whether engine speed is above a predetermined value;

(c) energizing said coil winding means to a first degree so as to impart a large opening force to said valve member to cause said valve member to open said port when engine speed is determined to be above the predetermined valve and when it is determined that said electromagnetic coil winding means is not energized to cause said valve member to open said port; and (d) energizing said coil winding means to a second degree less than said first degree so as to impart to said valve an opening force smaller than said large opening force to open said port when said electromagnetic coil winding means is determined not to be energized to cause said valve member to open said port and said engine speed is determined to be below the predetermined value.

6. A fuel cutoff apparatus for a fuel injection pump in an internal combustion engine, comprising:

(a) a valve member movable to selectively open or block a port connecting a course of fuel to a fuel line;

(b) an electromagnetic coil means selectively energizable at a plurality of distinct energy levels to move said valve member to open or block the port; and (c) a controller means for determining whether said coil means is being energized to a level for causing said valve member to open or block said port, for determining whether engine speed is above a predetermined value when said energy level of said coil means is determined to be at a level causing said valve member to block said port member, and for energizing said coil means to a first degree so as to impart a large opening force to said valve member to cause said valve member to open said port when engine speed is determined to be above the predetermined value and when said coil means is determined to be energized to a level causing said valve member to block said port, and for energizing said coil means to a second degree less than the first degree so as to impart a relatively small opening force to said valve member to cause said valve member to open said port when engine speed is determined to be below the predetermined value and when said coil means is determined to be energized at a level causing said valve member to block said port.

7. A method of facilitating efficient operation of a fuel cutoff apparatus for a fuel injection pump which selectively blocks and opens a port connecting a fuel source and a fuel pump of an engine with a ferromagnetic valve member actuable by an electromagnetic coil winding means, said coil winding means energizable at a plurality of distinct energy levels to move said valve member, said valve member having an auxiliary fuel passageway extending therethrough so as to communicate between the source of fuel and the fuel line and further including a pressure relief member disposable in said auxiliary fuel passageway and means for biasing said pressure relief member so as to normally block said auxiliary fuel passageway, comprising the steps of:

(a) determining whether said coil winding means is energized to an energy level causing said valve member to block said port;

(b) when it is determined that said coil winding means is energized to cause said valve member to block said port, determining whether engine speed is above a predetermined value; and (c) energizing said coil winding means to a first degree so as to impart an opening force to said valve member to move said pressure relief member to unblock said auxiliary fuel passageway when engine speed is determined to be above the predetermined value and thereafter to move said valve member to open said port.

8. A fuel cutoff apparatus as set forth in claim 3, wherein said controller means further operates to energize said coil means to substantially the same degree as the second degree to hold said valve member in its open position after said valve member has opened said port.

9. A fuel cutoff apparatus as set forth in claim 8, wherein said coil means includes a single coil.

10. A fuel cutoff apparatus as set forth in claim 3, wherein said coil means includes a first and a second coil, both said first and second coils being energized when said coil means is energized to the first degree so as to impart the relatively large opening force to said valve member, and said first coil alone being energized when said coil means is energized to the second degree so as to impart the relatively small opening force to said valve member.

11. A fuel cutoff apparatus as set forth in claim 9, further including:

(a) resistor adapted to be connected in circuit with said coil means when said coil means is to be energized to the second degree;

(b) a relay operated responsively to said controller means when said valve member is to open said port; and (c) a switch means actuated by said relay for bypassing said resistor to energize said coil means to the first degree.

12. A fuel cutoff apparatus as set forth in claim 1, wherein said valve member has an auxiliary fuel passageway extending therethrough so as to communicate between the source of fuel and the fuel line; and further including:

(a) a pressure relief member disposed in said auxiliary fuel passageway; and (b) means for biasing said pressure relief member so as to normally block said auxiliary fuel passageway;

whereby said electromagnetic coil means is energized to apply an electromagnetic force directly to said valve member to move said pressure relief member to unblock said auxiliary fuel passageway and thereafter to move said valve member to open said port.

13. A fuel cutoff apparatus as set forth in claim 12, wherein said valve member is operable in combination with said pressure relief member and said means for biasing said pressure relief member responsively to energization of said electromagnetic coil means for first moving said pressure relief member to unblock said auxiliary fuel passageway and thereafter for moving said valve member to open said port.

14. A fuel cutoff apparatus as set forth in claim 12, wherein said controller means is operable for energizing said coil means to a first degree when engine speed is determined to be above a predetermined value for opening said port and for energizing said coil means to a second degree, lesser than said first degree, when engine speed is determined to be below the predetermined value for holding said valve member in a position in which said port remains open.

15. A fuel cutoff apparatus as set forth in claim 12, wherein said pressure relief member is provided with an axial internal bore, said biasing means comprising a spring received in said internal bore and exerting pressure axially on the bore.

16. A fuel cutoff apparatus as set forth in claim 3 wherein said controller means is further operable for determining whether said coil means is energized to the first degree when said coil means is determined to be energized to a level causing said valve member to open said port, and for energizing said coil means to said second degree when said coil means is determined to be energized to the first degree, in order to hold said valve member in an open position.

17. A fuel cutoff apparatus as set forth in claim 3, wherein said controlling means is responsive to external signals representing a plurality of operating conditions of the engine and also representing atmospheric conditions.

18. A method as claimed in claim 2 further including the steps of determining whether said coil winding means is energized to the first degree when it is determined that said valve member is not caused to block said port, and energizing said coil winding means to said second degree to hold said valve member in a position to maintain said port open when it is determined that said valve member is not caused to block said port and that said coil winding means is energized to the first degree.

19. A method as claimed in claim 18 comprising the further step of energizing said coil winding means to the second degree when it is determined that said valve member is not caused to block said port and that said coil winding means is not energized to the first degree.

* * * * *